3,536,748
CATALYTIC ISOMERIZATION OF 2-METHYL-3-BUTENENITRILE TO LINEAR PENTENE-NITRILES
William C. Drinkard, Jr., and Richard V. Lindsey, Jr., Wilmington, Del., assignors to E. I. du Pont de Nemours and Company, Wilmington, Del., a corporation of Delaware
No Drawing. Continuation-in-part of application Ser. No. 509,432, Nov. 23, 1965. This application Oct. 26, 1967, Ser. No. 678,171
Int. Cl. C07c *121/30*
U.S. Cl. 260—465.9        11 Claims

ABSTRACT OF THE DISCLOSURE

The present invention discloses the isomerization of 2-methyl-3-butenenitrile to linear pentenenitriles by means of zero-valent nickel complexes used as catalysts at temperatures in the range 10–200° C. The linear pentenenitrile products are useful as intermediates to adiponitrile.

RELATED APPLICATION

This application is a continuation-in-part of our copending, coassigned application Ser. No. 509,432 filed Nov. 23, 1965, now U.S. Pat. 3,496,215.

BACKGROUND OF THE INVENTION

Our above mentioned copending application Ser. No. 509,432 discloses and claims the hydrocyanation of olefinic compounds in the presence of certain zero-valent nickel complexes. Among the olefinic compounds that can be reacted with hydrogen cyanide by the process there claimed are $C_5$-monounsaturated nitriles such as 2-methyl-3-butenenitrile and 3- and 4-pentenenitriles. It has now been found that the zero-valent nickel complex catalyzes isomerization of 2-methyl-3-butenenitrile mainly to 3-pentenenitrile and slightly to 4-pentenenitrile. These isomerizations are not disclosed in the above-mentioned application, but essential operable conditions for the same are set forth in Example XIII, which describes contacting 2-methyl-3-butenenitrile with tetrakis(triphenyl phosphite)-nickel(O) at 100° C. prior to addition of hydrogen cyanide.

SUMMARY AND DETAILS OF THE INVENTION

The process of this invention is a method of preparing linear pentenenitriles by contacting 2-methyl-3-buteneni-trile with a zero-valent nickel complex at any temperature in the range 10–200° C. by means of the hitherto unknown reaction:

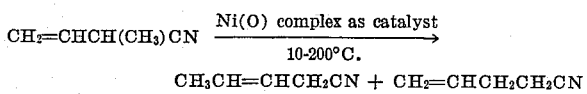

$CH_3CH=CHCH_2CN + CH_2=CHCH_2CH_2CN$

The active nickel catalysts, catalytic amounts of which are requisite in the immediate process, are nickel compounds of the general formula $Ni(PXYZ)_4$ wherein X is OR and Y and Z are selected from the class consisting of OR and R, R being selected from the class consisting of alkyl and aryl groups having up to 18 carbon atoms. If desired, any of X, Y and Z may be conjoined. Examples of divalent conjoined Y and Z are tetramethylene, pentamethylene, and ethylenedioxy groups. The ethylenedioxy group is an example of divalent conjoined X and Y or Z. It is believed that in these nickel compounds (complexes) at least some of the nickel is present in the zero-valent state. The preferred catalysts are the zero-valent nickel complexes in which the neutral ligands P(XYZ) are the aryl phosphites, such as triphenyl phosphite, tris(p-chlorophenyl) phosphite, tris-(p-methoxyphenyl) phosphite, and tris(p-cresyl) phosphite. Under some of the reaction conditions of the present invention, one or more of the ligands may become dissociated from the nickel. In this specification, however, specific mention of one of the $Ni(PXYZ)_4$ compounds as a catalyst refers to the compound added to the reaction mixture.

The zero-valent nickel catalyst preferably is prepared prior to use. Methods of preparing the catalysts are disclosed in U.S. Pats. 3,152,158 and 3,328,443 and also in our above-identified application Ser. No. 509,432. However, catalyst can also be prepared in situ by placing in the reaction mixture an alkyl or aryl phosphite together with an intermediate zero-valent nickel compound or an intermediate organonickel compound having a nickel-carbon bonds. The amount of phosphite ester relative to the nickel compound is preferably the amount equivalent to that in the corresponding tetrakis(phosphite)nickel(O) complex or an excess of that amount. It is not entirely certain what unseparated reaction products are formed in the reaction mixture by the in situ preparation process, although zero-valent nickel is believed always to be present. Consequently, the catalyst formed in such in situ preparations may be referred to simply as a "reaction product."

The intermediate zert-valent nickel compounds which form active catalysts in situ on addition of an alkyl or aryl phosphite can themselves be prepared in situ prior to addition of the phosphite ester. Such nickel compounds, which include those containing carbon monoxide, phosphines, arsines, stibenes, arsenites, stibites, acrylonitrile, and mixtures thereof, can be represented by the formula

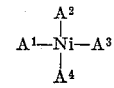

wherein $A^1$, $A^2$, $A^3$, and $A^4$ are neutral ligands, which may be the same or different, and represent carbon monoxide, acrylonitrile, and P(X'Y'Z') wherein X', Y', and Z' are the same or different and are defined as a member of the class consisting of R', $NR'_2$, Cl, and F, and wherein R' is a member of the class consisting of alkyl and aryl groups having up to 18 carbon atoms. When acrylonitrile is a neutral ligand, the values of $A^1$, $A^2$, $A^3$, and $A^4$ in the above formula are satisfied by two molecules of acrylonitrile alone (one molecule being represented by a pair of the A's) or by two molecules of acrylonitrile and two P(X'Y'Z') entities (one molecule of acrylonitrile being represented by one of the A's).

There are several techniques for in situ preparation of the intermediate zero-valent nickel compounds. For example, nickel carbonyl and a neutral ligand as defined above (other than carbon monoxide) can be added to the reaction mixture. It is preferred to wait until carbon monoxide evolution ceases before using the compound. Generally, at least two moles and preferably all four moles of CO are replaced by another ligand such as triphenyl phosphite. A second technique involves adding the neutral ligand (as defined above), a nickel (II) compound such as a nickel halide, e.g., $NiCl_2$, $Ni(CN)_2$, or Ni-bis-acetylacetonate and a source of hydride $(H^-)$ ions. Suitable sources of $H^-$ ions are compounds of the structure $M'[BH_4]_n$, $M'[AlH_4]_n$, $H_2$, and $M'H_n$ where M' is an alkali metal or an alkaline earth metal and $n$ is a number corresponding to the valence of the metal. A third technique is to add dicyclopentadienylnickel and a neutral ligand such as $P(OR)_4$ where R is aryl to the reaction mixture. In each case, the compound is formed under the displacement reaction conditions described above and no other special temperatures or pressures need be observed.

In many instances, it is advantageous to have an excess of certain neutral ligands present with respect to the nickel in the catalyst. The preferred excess ligand are the aryl phosphites wherein the aryl groups contain up to 18 carbon atoms. Generally, the excess ligand is present in at least a two molar excess as based on the nickel present. The only limit of excess ligand involves practical considerations for it may even be used as the solvent. However, generally there is little advantage to be obtained in using over a 300 mole excess of ligand as based on one mole of nickel, since the rate of the displacement reaction becomes too slow to be practical due to the decreased concentration of nickel present. This use of excess of ligand may be used to extend catalyst life. The excess ligand used may be the same or different from the ligand attached to nickel in the intermediate nickel compound.

The intermediate zero-valent nickel compounds and also the zero-valent nickel catalysts and catalytic reaction products prepared in situ are characterized by having neutral ligands which are thought to be bonded to the central metal atom by both sigma- and pi-type bonds. This type of bonding is described, for example, in Cotton and Wilkinson (Advanced Inorganic Chemistry, Interscience Publishers, 1962, pp. 602–606).

The process of the invention is normally carried out at atmospheric pressure and at any temperature in the range 10–200° C., preferably in the range 60–120° C. The pressure is not critical, however, and can be above or below atmospheric pressure if desired. Any of the conventional batch or continuous flow procedures may be used either in the liquid phase or in the vapor phase (with respect to the relatively volatile 2-methyl-3-butenenitrile reactant and linear pentenenitrile products). The reactor may be of any mechanically and chemically resistant material, and is usually of glass or an inert metal or alloy, e.g., nickel, copper, silver, gold, platinum, stainless steel, Monel®, Hastelloy®, etc.

The process is usually carried out "neat," i.e., without an added diluent or solvent. Any solvent or diluent that is nondestructive of the catalyst can be used, however. Suitable solvents include aliphatic or aromatic hydrocarbons (hexane, cyclohexane, benzene), ethers (diethyl ether, tetrahydrofuran, dioxane, glycol dimethyl ether, anisole), esters (ethyl acetate, methyl benzoate), nitriles (acetonitrile, benzonitrile), etc.

A nonoxidizing environment is desirable in order to retard oxidative deactivation of the catalyst. Accordingly, an inert atmosphere, e.g., nitrogen, is normally and preferably used, although air may be used if desired at the expense of loss of a proportion of the catalyst through oxidation.

When the process is a typical batch operation in the liquid phase with or without a solvent, the catalytic nickel complex is soluble to some extent at temperatures within the operable range and is usually completely soluble at the most preferred operating temperature. However, the nickel complex is essentially nonvolatile, whereas the 2-methyl-3-butenenitrile reactant and the linear pentenenitrile products are relatively volatile. Accordingly, in a continuous flow procedure the catalyst may be a component of the flowing system in a completely liquid-phase operation, it may be in a mobile nonflowing liquid state in a semi-vapor phase operation, or it may be in a fixed-bed state (usually on a solid support) in a conventional flowing vapor-phase operation.

The time element in the process is not critical, and may generally be governed by practical considerations. The time required for a practical level of conversion of 2-methyl-3-butenenitrile to linear pentenenitriles is dependent upon the temperature of reaction, i.e., operation at lower temperature generally requires a longer time than operation at a higher temperature. A practical reaction time can be in the range of a few seconds to many hours, depending on the particular conditions and method of operation.

The molar ratio of 2-methyl-3-butenenitrile to catalyst is generally greater than 1:1, usually in the range from about 10:1 to 2000:1, for a batch operation. However, it is usually in lower proportions, e.g., 1:2, for a continuous operation with a fixed-bed catalyst.

It is stated above that the related copending coassigned assigned patent application identified by Ser. No. 509,532 discloses the catalytic zero-valent nickel complex of the present invention as it is used in effecting hydrocyanation of pentenenitriles, including 2-methyl-3-butenenitrile. In the presence of hydrogen cyanide, the nickel complex preferentially catalyzes formation of a six-carbon saturated nitrile (2-methylglutaronitrile) from 2-methyl-3-butenenitrile. Because of the overriding competitive hydrocyanation reaction, in the practice of the present rearrangement isomerization reaction it is necessary to avoid the presence of large amounts of hydrogen cyanide, i.e., any amount of the order of or in excess of 1:1 mole ratio with the 2-methyl-3-butenenitrile starting material. However, hydrogen cyanide has no significant effect per se on the isomerization reaction and its presence in minor amounts in the starting material can be tolerated if necessary. The isomerization process is preferably conducted in the absence of hydrogen cyanide.

EMBODIMENTS OF THE INVENTION

There follow some nonlimiting examples illustrative of the process of the present invention. Examples 1–4 show the use of a preformed catalyst while Examples 5–7 show use of a reaction product formed in situ. In these examples, unless otherwise noted, reaction pressures are autogenous. Other pressures are given in terms of mm. of mercury, and temperatures, in degrees centigrade. Analyses were made by gas chromatography and the percent ages are expressed in terms of area. Gas chromatographic data expressed in area percent are approximations of weight percent. See Purnell, "Gas Chromatography," John Wiley and Sons, page 285 (1962).

EXAMPLE 1

A 400-ml. stainless-steel reactor was charged with 5.0 g. of tetrakis(triethyl phosphite)nickel(O), i.e.,

$Ni[P(OC_2H_5)_3]_4$ 10 ml. of benzene, and 10 ml. of a pentenenitrile fraction containing 84.7% 2-methyl-3-butenenitrile, 11% 3-pentenenitrile and 4.2% 2-methyl-2-butenenitrile. The reaction mixture was heated at 100° for eight hours under autogenous pressure. The resultant liquid product (19.3 g.) was distilled under a pressure of 0.1 mm., the pot temperature being advanced gradually to 100°. Distillate, 14.63 g.; residue, 3.22 g.

Gas chromatographic analysis of the distillate showed it to contain 34% 2-methyl-3-butenenitrile, 13% 3-pentenenitrile, 52% 2-methyl-2-butenenitrile and 0.4% 4-pentenenitrile.

EXAMPLE 2

A mixture of 5.0 g. of $Ni[P(OC_2H_5)_3]_4$ and 20 g. of a pentenenitrile fraction containing 98.9% 2-methyl-3-butenenitrile, 0.5% 2-methyl-2-butenenitrile and less than 0.1% 3-pentenenitrile, charged under nitrogen, was heated at 100° for 2.5 hours. The crude product, analyzed by gas chromatography, contained 69.7% 2-methyl-3-butenenitrile, 26.9% 2-methyl-2-butenenitrile and 2.5% 3-pentenenitrile.

EXAMPLE 3

A 10-ml., 3-necked flask equipped with a condenser, thermocouple and rubber serum cap for withdrawing samples was charged with a 0.322 g. of tetrakis[tri(p-cresyl)-phosphite[nickel(O), i.e. $Ni[P(OC_6H_4CH_3)_3]_4$, and 2.0 cc. of 99.6% 2-methyl-3-butenenitrile. The starting material contained no 3- or 4-pentenenitrile. The reaction mixture, kept under nitrogen at all stages, was heated gradually with stirring to 80° C. and held there for 3 hours. The mixture was then cooled to room temperature, and a sample was withdrawn for analysis by gas chromatography. The product contained 93.0% unchanged 2-methyl-3-butenenitrile and 6.2% 3-pentenenitrile.

EXAMPLE 4

A 10-ml., 3-necked flask equipped with a condenser, thermocouple and rubber serum cap for withdrawing samples was charged with 0.364 g. of tetrakis[tri(p-methoxyphenyl)phosphite]nickel(O), i.e., Ni[P(OC$_6$H$_4$OCH$_3$)$_3$]$_4$, and 2.0 cc. of 99.7% 2-methyl-3-butenenitrile. The starting material contained no 3- or 4-pentenenitrile. The reaction mixture, kept under nitrogen throughout all stages, was stirred at room temperature. A light yellow solution was formed. A sample was withdrawn at about 13 min. after mixing for analysis by gas chromatography. The product contained 0.6% 3-pentenenitrile and 99.1% unchanged 2-methyl-3-butenenitrile.

EXAMPLE 5

A mixture of 1.9 grams of bis(cyclopentadienyl) nickel, i.e., [Ni(C$_5$H$_5$)$_2$], 16 grams of triphenyl phosphite and 20 grams of 2 - methyl - 3 - butenenitrile containing 0.24% 2 - methyl - 2 - butenenitrile and no detectable amount of 3 - pentenenitrile, charged and maintained under nitrogen, was heated at 114–120° for 3 hours. The crude product, analyzed by gas chromatography, contained 93.23% 2-methyl - 3 - butenenitrile, 4.77% 3 - pentenenitrile, 1.33% 2 - pentenenitrile and 0.65% 2 - methyl - 2 - butenenitrile.

EXAMPLE 6

A mixture of 2.3 grams of [(C$_5$H$_5$)Ni(SC$_6$H$_5$)]$_2$, 16 grams of triphenyl phosphite and 20 grams of 2-methyl-3-butenenitrile (same purity as in Example 5), charged and maintained under nitrogen, was heated at 114–120° for 3 hours. The crude product, analyzed by gas chromatography, contained 98.48% 2 - methyl - 3 - butenenitrile, 0.80% 3 - pentenenitrile, 0.49% 2 - methyl - 2 - butenenitrile and 0.12% 2-butenenitrile.

EXAMPLE 7

A mixture of 1.5 grams of [(C$_5$H$_5$)Ni(CO)]$_2$, 16 grams of triphenyl phosphite and 20 grams of 2-methyl-3-butenenitrile (cf. Examples 5 and 6), charged and maintained under nitrogen, was heated at 120° for 3 hours. The crude product, analyzed by gas chromatography, contained 92.44% 2 - methyl - 3 - butenenitrile, 7.04% 2 - methyl-2-butenenitrile and 0.50% 3-pentenenitrile.

The linear pentenenitriles (3-pentenenitrile and 4-pentenenitrile) obtained by means of the present invention are useful as intermediates to adiponitrile, itself a well known intermediate for the production of commercial polyamides useful in the form of fibers, films and molded articles.

Since obvious modifications and equivalents in the invention will be evident to those skilled in the chemical arts, we propose to be bound solely by the appended claims.

The embodiments of the invention in which an exclusive property or privilege is claimed are defined as follows:

1. The process of isomerizing 2-methyl-3-butenenitrile and thereby producing at least one linear pentenenitrile which comprises:

contacting 2-methyl-3-butenenitrile, at a temperature in the range 10–200° C., with a zero-valent nickel catalyst of the formula

wherein X is OR, and Y and Z are selected from OR and R, R being an alkyl or hydrocarbyl aryl of up to 18 carbon atoms; it being further provided that any two of X, Y and Z can be joined to form a lower alkylene or the ethylenedioxy group.

2. The process of claim 1, wherein the zero-valent nickel catalyst is formed in situ by reaction of an alkyl or aryl phosphite in which the alkyl or aryl groups have up to 18 carbon atoms with an intermediate nickel compound of the formula

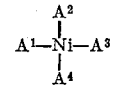

wherein A$^1$, A$^2$, A$^3$ and A$^4$ are the same or different neutral ligands of the group consisting of:

(a) carbon monoxide;
(b) P(X'Y'Z'), wherein X', Y' and Z' are the same or different and are members of the group consisting of R$^1$, NR$^1$$_2$, Cl, and F; R$^1$ being a lower alkyl or hydrocarbyl aryl of up to 18 carbon atoms;
(c) acrylonitrile, 2 molecules of acrylonitrile satisfying either all of the A's or only two of the A's, in the latter case the other two A's being satisfied by P(X'Y'Z').

3. The process of claim 1 wherein the temperature is in the range 60–120° C.

4. The process of claim 1 accomplished in the presence of hydrogen cyanide, the cyanide:butenenitrile ratio being no greater than 1:1.

5. The process of claim 1 accomplished in the substantial absence of hydrogen cyanide.

6. The process of claim 1 wherein the catalyst is tetrakis(triethyl phosphite)nickel(O).

7. The process of claim 1 wherein the catalyst is tetrakis[tris(p-cresyl)phosphite]nickel(O).

8. The process of claim 1 wherein the catalyst is tetrakis[tri(p-methoxyphenyl)phosphite]nickel(O).

9. The process of claim 2 wherein the nickel catalyst is formed in situ by the reaction of bis(cyclopentadienyl) nickel and an alkyl or aryl phosphite.

10. The process of claim 2 wherein the nickel catalyst is formed in situ by the reaction of a nickel carbonyl with an alkyl or aryl phosphite.

11. The process of enriching in 5-carbon, straight-chain, ethylenically unsaturated nitriles a mixture containing such nitriles and a methylbutenenitrile which comprises contacting the mixture at a temperature in the range 10–200° C. with a catalyst of claim 1.

References Cited

UNITED STATES PATENTS 2,571,099  10/1951  Arthur et al. ___ 260—465.8 XR

JOSEPH P. BRUST, Primary Examiner.

U.S. Cl. X.R.

260—439, 465.8